Jan. 1, 1963 J. W. HARRIS 3,071,322

INFORMATION CORRELATING AND INDICATING DEVICE

Filed Aug. 4, 1960 3 Sheets-Sheet 1

INVENTOR.
JOHN W. HARRIS

BY Mallinckrodt and Mallinckrodt

ATTORNEYS

Jan. 1, 1963 J. W. HARRIS 3,071,322

INFORMATION CORRELATING AND INDICATING DEVICE

Filed Aug. 4, 1960

3 Sheets-Sheet 2

INVENTOR.
JOHN W. HARRIS

BY Mallinckrodt and Mallinckrodt

ATTORNEYS

Jan. 1, 1963 J. W. HARRIS 3,071,322

INFORMATION CORRELATING AND INDICATING DEVICE

Filed Aug. 4, 1960 3 Sheets-Sheet 3

INVENTOR.
JOHN W. HARRIS

BY Mallinckrodt and Mallinckrodt
ATTORNEYS

United States Patent Office 3,071,322

Patented Jan. 1, 1963

3,071,322
INFORMATION CORRELATING AND INDICATING DEVICE

John Wallace Harris, 626 University St., Blackfoot, Idaho

Filed Aug. 4, 1960, Ser. No. 47,480
2 Claims. (Cl. 235—88)

Figure 1:
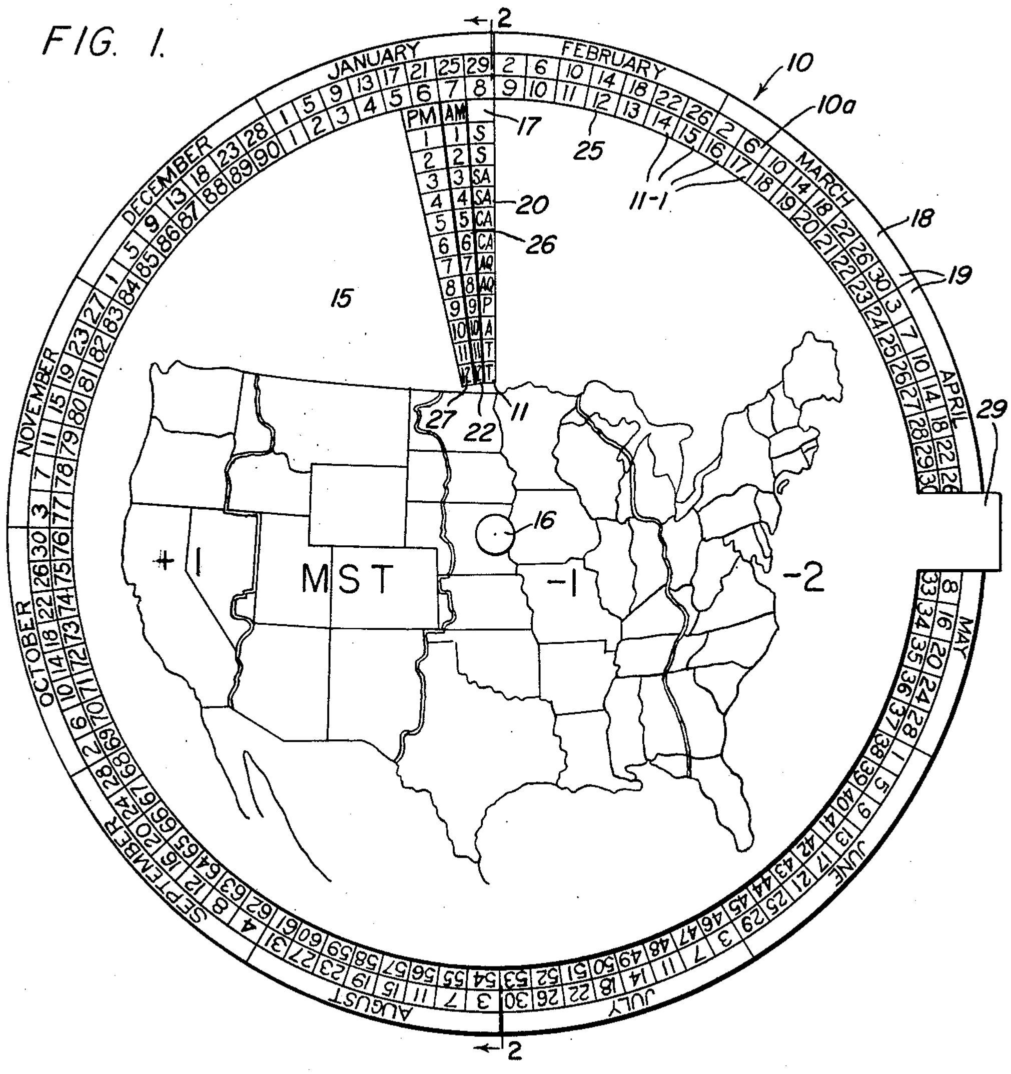

This invention relates to information correlating and indicating devices characterized by a plurality of disks concentrically secured together for rotation relative to one another.

Devices of this kind are common for the purpose of presenting tabulated information, such as mathematical tables, in a manner which facilitates the finding of desired items of information on the basis of known related items.

The purpose of this invention is to provide such a device which is especially adapted to present and to correlate various items of astrological information based on selected facts of birth applicable to the user or to some other person. The device of the invention is primarily useful in this connection as part of an astrological game or entertainment kit, whereby a person may arrive at astrological conclusions applicable to himself or to others on a relatively sophisticated basis, without consulting a professional astrologer.

While this is the sole use presently contemplated for the device, other uses may well become apparent from the unique structural features involved.

Such features include the combination with a base disk divided into a multiplicity of sectors, each of which is marked with a radially extending series of items, of at least one superimposed disk having a sector-shaped and sector-placed slot therein and along a margin of which slot is marked a radially extending series of correlated items in registry with the series of items on the base disk. For the present astrological purpose, there is a second superimposed disk provided with a similar sector-shaped and sector-placed slot and a similarly marked slot margin, this slot being approximately twice as wide as the slot on the first superimposed disk, so that a simultaneous correlation of information carried by the slot margins of the respective superimposed disks and an individual sector division of the base disk may be made. Also, for the present astrological purposes, the first or intermediately positioned disk superimposed on the base disk is divided into information-marked sectors throughout its circumferential extent in a manner corresponding to the base disk, and the base disk is of greater diameter with additional sector markings on its circumferential excess. Moreover, corresponding tabs extend outwardly from the slotted, superimposed disks at locations which insure side-by-side juxtaposition of the marginal, marked sectors of these disks when such tabs are brought into registry with one another.

It will be evident that, should a particular use require additional superimposed disks, these may be provided in corresponding manner to give still further opportunity for carrying and correlating additional information.

A specific embodiment representing what is presently regarded as the best mode of carrying out the invention is illustrated in the accompanying drawing.

Figure 2:
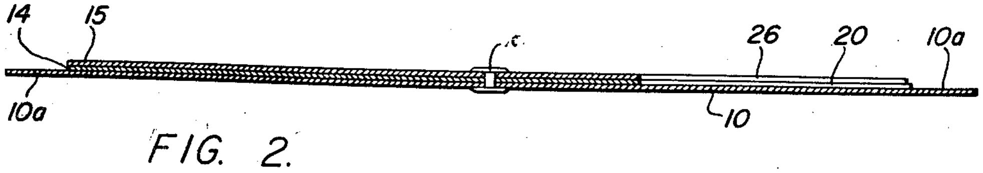
Figure 3:
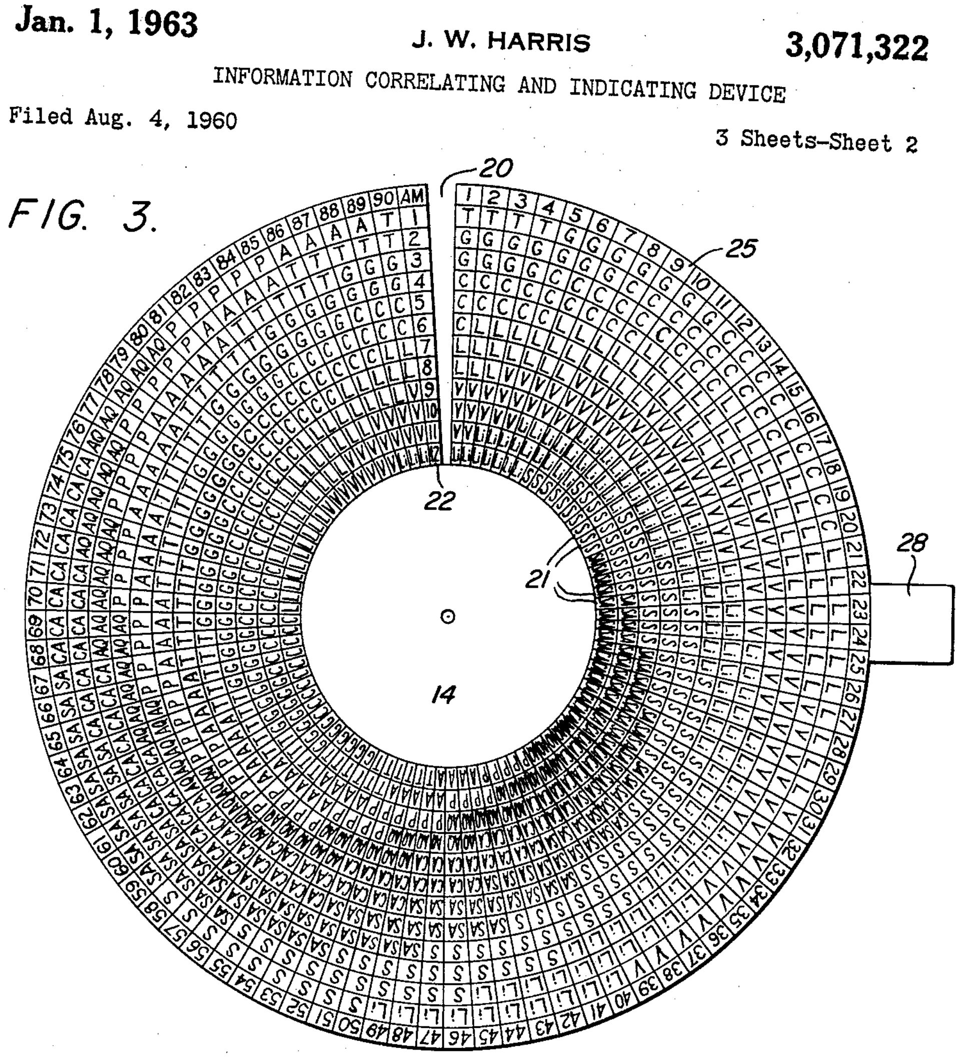
Figure 5:
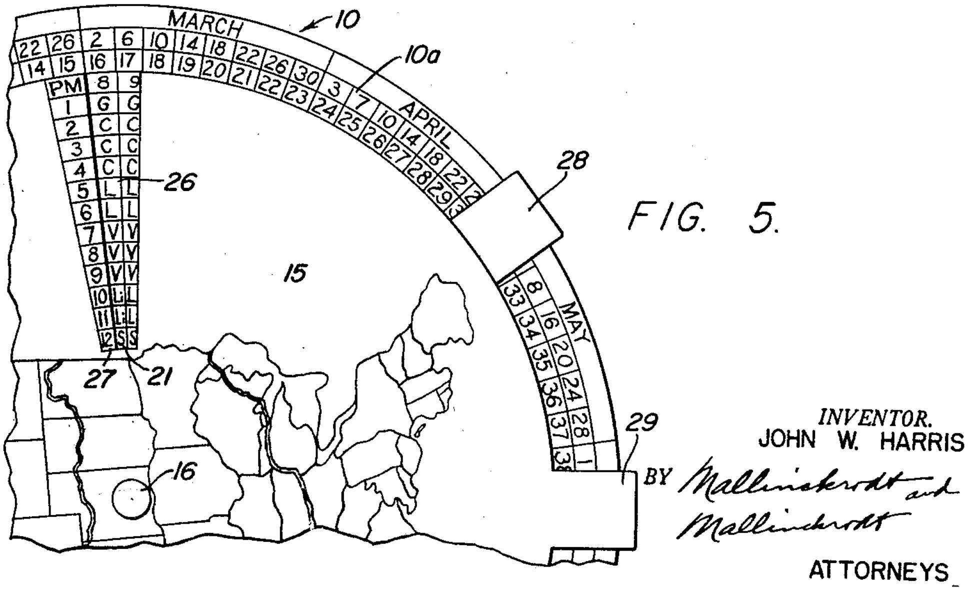
Figure 4:
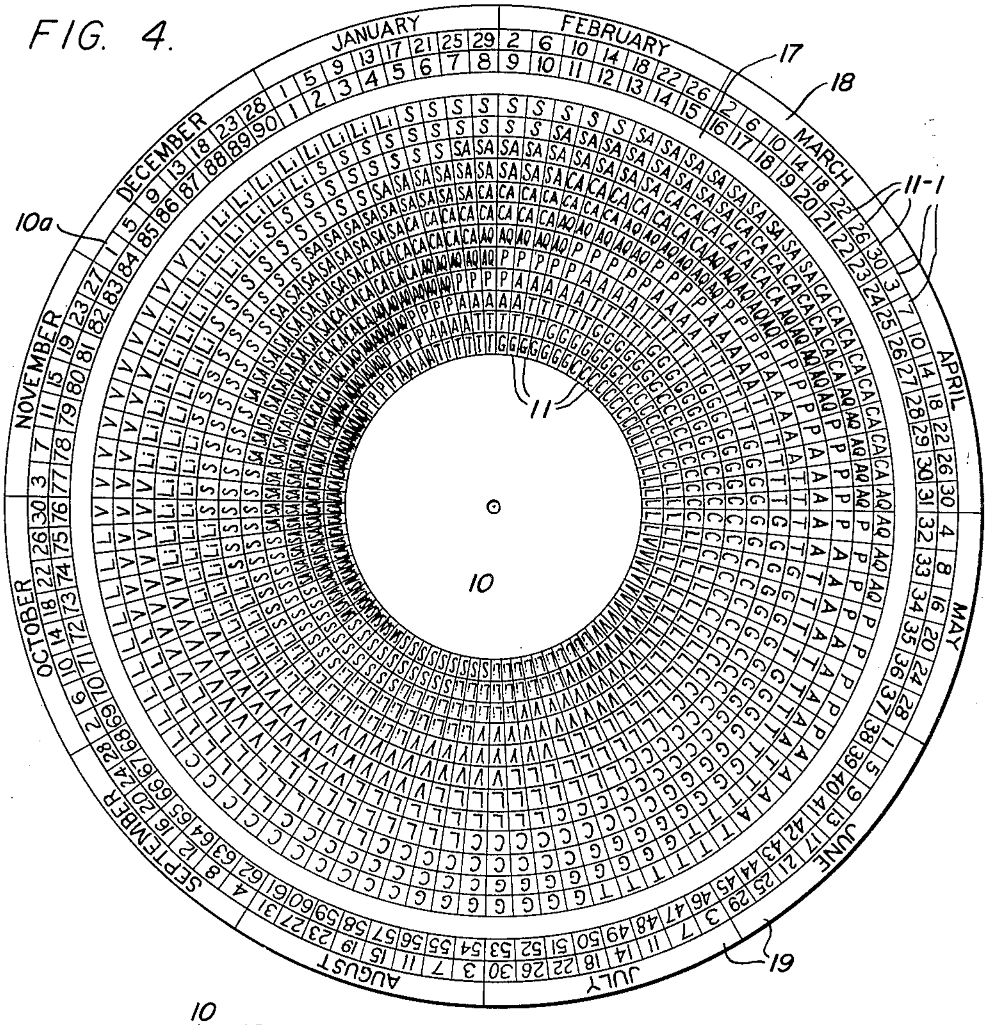
Figure 6:
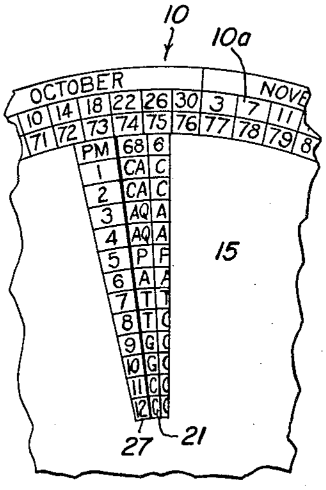

In the drawings:

FIG. 1 represents a top plan view of the device as marked with astrological information in a manner which will enable a user to find his or someone else's ascendant, i.e. the zodiac sign which was on the horizon at the time of birth;

FIG. 2, a diametric section taken along the line 2—2 of FIG. 1;

FIG. 3, a top plan view of the intermediate disk alone, showing the information required for this particular astrological use of the device;

FIG. 4, a similar view of the base disk;

FIG. 5, a fragmentary view corresponding to that of FIG. 1, but showing a different setting of the disks;

FIG. 6, a similar but still more fragmentary view showing another setting of the disks.

Referring to the drawings:

In the illustrated form of the device, a base disk 10, see particularly FIG. 4, has one of its faces divided into a multiplicity of sectors 11, which are marked, respectively, with radially extending series of zodiac signs placed in a predetermined arrangement based on the information desired in the use of the device.

Concentrically superimposed upon this marked face of base disk 10 are two additional disks 14, FIG. 3, and 15, FIG. 1, rotatably secured to each other and to such base disk 10 by some suitable means, such as the rivet 16.

Disks 14 and 15 are of equal diameter, but base disk 10 is of greater diameter to provide a protruding, circumferential margin 10*a*. This margin is divided into continuations 11–1 of the sectors 11, there being a blank annular area 17 separating the two. The sector continuations 11–1 are marked with radially extending series, respectively, of day-dates and arbitrary numbers selected and placed in a predetermined arrangement correlated with the markings in the sectors 11, and an annular marginal area 18 is divided into comparatively wide sectors 19 comprehending respective groups of the sector continuations 11–1 and marked with appropriate months of the year, respectively. The arbitrary numbers are sequential, it will be noted, running from 1 to 90.

Disk 14, which, in the present form of the device, is interposed between base disk 10 and upper disk 15 and is, therefore, spoken of as the "intermediate" disk, has a sector-shaped and sector-placed slot 20 therein. In the present instance, this slot 20 corresponds in width and length to an individual sector 11 of base disk 10. Also in the present instance, the upper face of intermediate disk 14 is divided into sectors 21 corresponding in number and placement with the sectors of base disk 10. Each sector 21, except a sector 22 marginal to slot 20, is marked with a radially extending series of zodiac signs, the several series corresponding to those of base disk 10. Sector 22 is marked with a radially extending series of hour designations. The outer terminus of each series of zodiac signs in a sector 21 is marked with an arbitrary number to provide an annular series 25 of arbitrary numbers around the circumferential margin of intermediate disk 14. These arbitrary numbers are the same as those marked in the sector continuations 11–1 of base disk 10.

As illustrated, the annular series 25 overlies and registers with the blank annular area 17 of base disk 10. Also as illustrated, the arrangement of zodiac series with respect to arbitrary numbers is shifted for intermediate disk 14 by one-half the length of the series of such numbers. Thus, the particular series of zodiac signs aligned with the number "1" on intermediate disk 14 is aligned with the number "46" on base disk 10. The hour designations marked in sector 22 of intermediate disk 14 are for "A.M.," as indicated.

Upper disk 15 has a sector-shaped and sector-placed slot 26 which is arranged to register with slot 20 of intermediate disk 14 but which is twice as wide. Marked on the upper face of upper disk 15, along that margin of slot 26 which corresponds to the hour-designation-marked margin of intermediate disk 14, is a radially extending series 27 of hour designations for "P.M.," as indicated.

The disks 14 and 15 carry reference means in the form of mutally similar, outwardly projecting tabs 28 and 29, respectively, which are located so that, when in registry, the radially extending series of "A.M." and "P.M." time designations on intermediate disk 14 and upper disk 15, respectively, will be in side-by-side juxtaposition, as shown in FIG. 1.

In using the device for finding the ascendant, i.e. the zodiac sign which was on the horizon at time of birth, of a person whose astrological reading is desired, the month, day, and hour of birth of the person are noted as exactly as possible on the corresponding disk markings of the device. If the exact date of birth is not among the markings on the protruding, circumferential margin 10*a* of base disk 10, the marked day prior thereto is to be used, whether or not that day is in the same or the immediately preceeding month.

In instances where the hour of birth is "A.M.," disks 14 and 15 are rotated until the tabs 28 and 29 are in registry, as in FIG. 1, and then these two disks are rotated as one until slot 20 is directly in line with the date noted for the person concerned as it appears in one of the sector continuations 11–1 in the protruding, circumferential margin 10*a* of base disk 10. The appropriate series of zodiac signs in the corresponding sector 11 of base disk 10 will be found in side-by-side registry with the series of "A.M." hour designations bordering slot 20 on intermediate disk 14. The hour designation closest to the actual time of birth is used. The zodiac sign in line therewith is the correct one for the person concerned, while the number appearing immediately under the date marking in the particular sector continuation 11–1 concerned represents an ascendant number which is keyed to a compilation of astrological information contained in other material of appropriate character forming part of the game or kit.

In instances where the hour of birth is "P.M.," note is taken of the ascendant number appearing immediately under the date marking in the particular sector continuation 11–1 concerned, and, if that number is less than "45," upper disk 15 is rotated clockwise until that number in annular series 25 on intermediate disk 14 appears in registry with the left-hand portion of slot 26 of upper disk 15, see FIG. 5. The zodiac sign in line with the appropriate "P.M." hour designation is the correct one for the person concerned. If the ascendant number is greater than "45," upper disk 15 is rotated counterclockwise and the zodiac sign determined in similar manner, as in FIG. 6.

The information marked on base disk 10 and on intermediate disk 14 represents a mean of the several time zones across the United States. It is based on 40° latitude, which runs through approximately the center of the United States. The map appearing on the upper face of upper disk 15, as indicated in FIG. 1, merely calls attention to the fact that the device is applicable throughout the entire country.

Whereas this invention is here illustrated and described with respect to preferred specific embodiments thereof, it should be understood that various modifications and adaptations may be resorted to by those skilled in the art without departing from the essential inventive concepts disclosed and claimed.

I claim:

1. An astrological game device for finding a person's ascendant in accordance with his time of birth, said device comprising a base disk having one of its faces divided into a multiplicity of sectors; two additional disks concentrically superimposed upon said face of the base disk, each having a sector-shaped and sector-placed, open end slot therein, the open end of said slot being coincident with the circumferential edge of said additional disk, the slot of the intermediate disk corresponding in width and length with an individual sector of said base disk and the slot of the upper disk corresponding in length with but being twice as wide as an individual sector of said base disk, the two additional disks being of equal diameter, but said base disk being of greater diameter to provide a protruding circumferential margin which is divided into continuations of said sectors, the upper face of said intermediate disk being divided into sectors corresponding to those of said base disk; radially extending series of zodiac signs marked in said sectors, respectively, of said base disk; radially extending series of day-dates and arbitrary numbers marked in said sector continuations, respectively; month markings on the said margin of said base disk comprehending groups, respectively, of said sector continuations; radially extending series of zodiac signs marked in the said sectors, respectively, of said intermediate disk, except in one of said sectors marginal to the slot, which one sector is marked with a radially extending series of hour designations, the outer terminus of each zodiac sign series of said intermediate disk being marked with an arbitrary number to provide an annular series of arbitrary numbers around the circumferential margin of said intermediate disk; a radially extending series of hour designations marked along the margin of said upper disk which corresponds to the hour-designation-marked margin of said intermediate disk; and means rotatably securing said disks together at their centers.

2. The astrological game device of claim 1, additionally comprising reference means carried by said additional disks, respectively, said reference means being located so that, when in registry, the radially extending series of time designations on the intermediate and upper disk will be in side-by-side juxtaposition.

References Cited in the file of this patent

UNITED STATES PATENTS

| | | |
|---|---|---|
| 916,563 | Kristofek | Mar. 30, 1909 |
| 1,456,155 | Slauson | May 22, 1923 |
| 2,469,389 | Hellman et al. | May 10, 1949 |